United States Patent [19]

Terrier

[11] Patent Number: 5,406,787
[45] Date of Patent: Apr. 18, 1995

[54] AFTER-BURNING TURBO-JET ENGINE WITH A FIXED GEOMETRY EXHAUST NOZZLE

[75] Inventor: Douglas A. Terrier, Ft. Worth, Tex.

[73] Assignee: Lockheed Corporation Lockeed Fort Worth Company, Fort Worth, Tex.

[21] Appl. No.: 109,829

[22] Filed: Aug. 20, 1993

[51] Int. Cl.$^6$ .......................... F02K 3/075; F02K 3/10
[52] U.S. Cl. ...................................... 60/204; 60/226.3; 60/261
[58] Field of Search .................... 60/204, 226.1, 226.3, 60/233, 238, 261

[56] References Cited

U.S. PATENT DOCUMENTS

| | | | |
|---|---|---|---|
| 4,010,608 | 3/1977 | Simmons | 60/226.3 |
| 4,055,946 | 11/1977 | Sens | 60/204 |
| 4,080,785 | 3/1978 | Koff et al. | 60/226.1 |
| 4,409,788 | 10/1983 | Nash et al. | 60/226.3 |
| 4,813,229 | 3/1989 | Simmons | 60/204 |

Primary Examiner—Louis J. Casaregola
Attorney, Agent, or Firm—Baker & Botts

[57] ABSTRACT

A method and apparatus are provided for generating thrust in a turbo-fan engine (10), including generating additional thrust with after-burning. Sensors are used for monitoring a temperature in nozzle (26) of engine (10) and fan stream pressure of engine (10). The measured temperature in nozzle (26) and pressure in the fan stream are compared to a predetermined schedule for temperature and pressure by controller (54). Based on the comparison, a portion of the fan stream will be modulated to fan stub stage (16) by variable bypass control (30). Variable bypass control (30) provides for variable compression within variable compression generator (12). The variable compression available from generator (12) is scheduled against the temperature rise and back pressure associated with after-burning so as to alleviate back pressure without having to increase the area of nozzle (26). This provides for a unique turbo-fan engine with after-burning capability but with a fixed geometry exhaust nozzle (26).

21 Claims, 2 Drawing Sheets

AFTER-BURNING TURBO-JET ENGINE WITH A FIXED GEOMETRY EXHAUST NOZZLE

TECHNICAL FIELD OF THE INVENTION

This invention relates in general to the field of turbo-fan engines, and more particularly for a fixed geometry exhaust nozzle turbo-fan engine with after-burning capability.

BACKGROUND OF THE INVENTION

In order to meet the thrust requirements of military applications, military turbo-fan engines employ after-burning. During after-burning, the engine adds and ignites fuel in the exhaust of the turbo-fan engine to create additional thrust. A consequence of after-burning is that when the exhaust burns it becomes less dense and requires opening the nozzle of the engine to maintain air flow rate. Insufficient nozzle area creates back-pressure on the fan. This back pressure can cause the engine to stall.

A prior approach to prevent stalling during after-burning mode of a turbo-fan engine is to increase the cross-sectional flow area of the exhaust nozzle of the engine during after-burning. This allows the exhaust that the engine burns to escape more easily from the engine, thereby relieving the back pressure. The opening and closing of the engine's nozzle has the appearance of the iris of the human eye as the eye reacts to light.

Using an engine with an adjustable exhaust nozzle has many inherent disadvantages which penalize aircraft performance. The disadvantages include the mechanical complexity of the engine, the high weight of the engine's nozzle, the high cost of the nozzle, poor reliability and maintainability of the nozzle, adverse aerodynamic integration of the nozzle into the air frame, poor radar and thermal observables due to edges and gaps, difficult radar and thermal observables cooling and treatments, leakage losses, and difficult structural integration of the engine into the air frame.

In some military applications, the disadvantages associated with a variable geometry nozzle have prevented the use of an engine with after-burning capability. This is particularly important when trying to achieve low radar and thermal observables for stealth or radar avoiding aircraft. Therefore, currently available aircraft with stealth properties, such as the B-2 bomber, F-117 fighter, and A-12 attack aircraft all have fixed geometry nozzles, at the expense of no after-burning capability. The lack of after-burning capability denies these aircrafts the additional thrust available through after-burning, and therefore makes the plane and its crew more vulnerable to destruction.

A second approach to eliminate the inherent disadvantages of a variable geometry exhaust nozzle has been to provide an after-burning engine with an exhaust nozzle with a fixed aperture at the exit, but still having the capability and need to vary the internal flow area of the exhaust nozzle during after-burner mode. An inherent problem with this approach is that the variation of the nozzle throat, while maintaining the exit aperture fixed, produces a non-optimum area ratio in the nozzle which results in loss of thrust from the engine.

SUMMARY OF THE INVENTION

Therefore, a need has arisen for a turbo-fan engine with after-burning capabilities and a fixed geometry exhaust nozzle. In accordance with the present invention, a turbo-fan engine with fixed nozzle after-burning capabilities is provided which substantially eliminates or reduces disadvantages and problems associated with prior art after-burning turbo-fan engines with a variable geometry exhaust nozzle.

A method and apparatus are provided for generating thrust in a turbo-fan engine, including generating additional thrust with after-burning. The method comprises the steps of compressing air with a fan stage and compressor stage, mixing fuel with the compressed air, igniting the mixture of compressed air and fuel in a combustor causing the mixture to burn and expand, transferring the expanding mixture to turbine stages to drive shafts connected to the fan and compressor, and directing the exhaust from the turbine stage to a fixed area nozzle for discharge from the engine.

Also included in the engine is a fan duct to direct the fan stream air from the fan stage around the engine, and into the nozzle of the engine. The variable cycle engine used in this invention provides an additional stage of compression just aft of the fan stage by use of a fan stub stage. Exit air from the fan stage can be modulated to either bypass this stage or flow through it. In flowing through the stage additional compression occurs to produce a higher pressure in the fan stream. Variable geometry is also provided in the turbine stages to provide balanced work for the fan stub stage. Sensors are used for monitoring a temperature in the nozzle and fan stream pressure. The measured temperature in the nozzle and pressure in the fan stream are compared to a predetermined schedule for temperature and pressure. Based on the comparison, a portion of the fan stream will be modulated to the fan stub stage by a variable bypass control. More specifically, if the pressure is less than the scheduled temperature and pressure, then the portion of the fan stream to the fan stub stage is increased adding more pressure to the fan stream. If the measured pressure is greater than the schedule, then the portion of the fan stream to the fan stub stage is decreased.

More specifically, the present invention utilizes variable compression of the fan stream available through the fan stub stage in the control and operational method of the present invention to prevent back pressure of the fan stage when the engine enters after-burning mode, thereby eliminating the need for a variable nozzle.

Technical advantages of the present invention over previous variable nozzle after-burning turbo-fan engines include reduced weight of the fixed geometry exhaust nozzle engine over that of an engine with a variable nozzle. Because the fixed geometry nozzle does not require any moving parts, all of the hinges, seals, actuators, hydraulics and other mechanical items necessary to open and close the iris of the variable geometry nozzle can be eliminated. This is important because the nozzle weight in a typical variable nozzle jet engine can account for 20-30% of the jet engine's weight.

Another technical advantage of the present invention is the reduced nozzle cost per engine. An engine with a variable geometry nozzle in a military turbo-fan engine will typically have costs in the area of $350,000 per nozzle. It is estimated that the nozzle costs in the engine of the present invention will be less than half the cost of a variable geometry nozzle.

Another technical advantage of the present invention is reduced complexity of the engine due to the elimination of the parts necessary to open and close the iris of an engine with a variable exhaust nozzle. The reduction in complexity has a corresponding improvement in reliability and maintainability of the engine of the present invention. Part count reduction allows for obtaining higher reliability and less frequent and detailed maintenance of an engine of the present invention with a fixed geometry exhaust nozzle.

Another technical advantage of the engine of the present invention is the improved integration of the engine that can be achieved in an airframe. An engine of the present invention with a fully integrated fixed geometry exhaust nozzle blends in well with the aircraft contours leaving no corners or gaps showing. Because the engine's nozzle is not movable, this allows the aircraft designer considerable flexibility in shaping the nozzle to optimize integration with the airplane structure. The "blending" of the engine into the air frame helps reduce drag and achieve a smaller radar signature.

Another technical advantage of the present invention is improved low observables (LO). A fixed geometry nozzle can be designed to provide less radiative and reflective surfaces in both infrared and radar detection scenarios. Also, because there are no moving parts in the nozzle of the engine of the present invention, the surfaces of the nozzle, both internal and external, can be coated with materials that offer improved LO performance. Some of these coatings and materials are not durable enough to be used in a variable geometry exhaust nozzle. The engine of the present invention with the fixed geometry exhaust nozzle also allows for improved cooling techniques to diminish the probability of infrared detection of an aircraft using the engine of the present invention.

Another technical advantage of the present invention is the reduced leakage it provides. An engine with a variable nozzle has gaps and cracks that are necessary to accommodate the movement of the parts in the variable geometry nozzle. Air simply leaks out of those gaps and cracks rather than being exhausted axially from the engine for thrust thereby reducing performance of the engine. In the engine of the present invention with a fixed geometry nozzle, there are no gaps and cracks to allow for air leakage, therefore performance is not hindered.

Another technical advantage of the engine of the present invention is the enhanced structural integration of the engine achievable into an airframe. The fixed geometry exhaust nozzle of the engine of the present invention allows for more complete integration of the engine into the airframe.

Therefore, an engine of the present invention can be used to provide after-burning capability without suffering the disadvantages of prior art after-burning engines.

BRIEF DESCRIPTION OF THE DRAWINGS

For a more complete understanding of the present invention and the advantages thereof, reference is now made to the following description taken in conjunction with the accompanying drawings in which like reference numbers indicate like features and wherein.

DETAILED DESCRIPTION OF THE INVENTION

Figure 1:
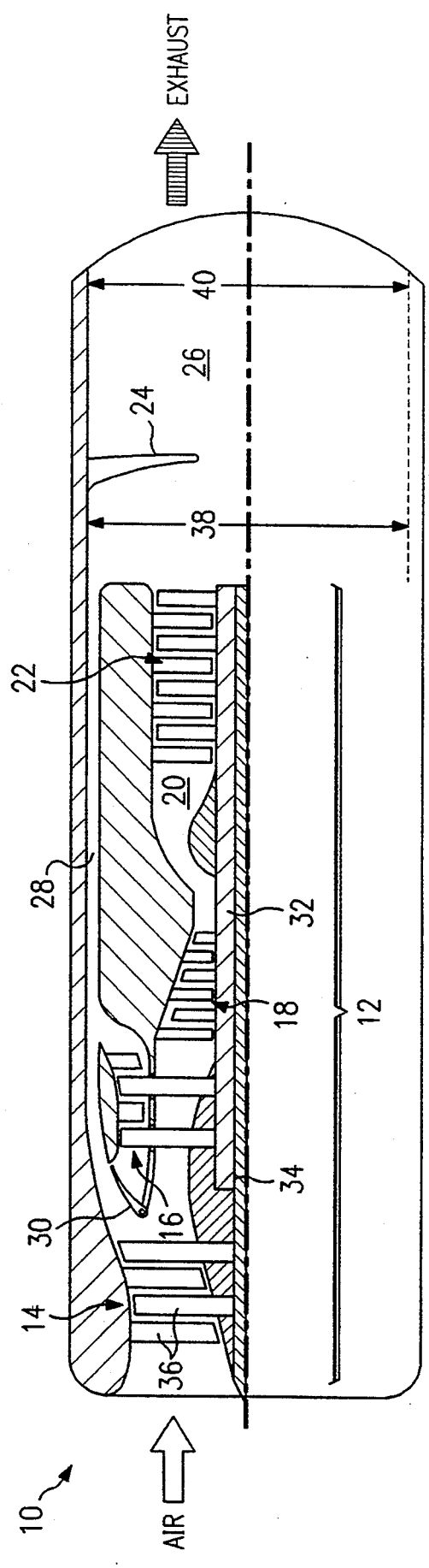
FIG. 1 depicts a simplistic cross-sectional view of a variable cycle engine with a fixed geometry exhaust nozzle.

The preferred embodiment of the present invention is illustrated in FIG. 1 of the drawings, like numerals being used to refer to like and corresponding parts of the various drawings.

In FIG. 1 is depicted variable cycle jet engine 10 with a fixed geometry exhaust nozzle of the present invention. Variable cycle engine (VCE) generator 12 comprises fan stage 14, fan stub stage 16, compressor stage 18, combustor 20, and turbine stage 22. Engine 10 depicted in FIG. 1 includes augmenter 24 and fixed geometry nozzle 26. Engine 10 also includes annular fan duct 28 running from fan stage 14 to nozzle 26.

A VCE is different from a standard turbo-fan engine in that it also includes fan stub stage 16 which can be used to impart additional pressure to the air driven by fan stage 14, referred to as the fan stream, before the fan stream is passed onto the back of generator 12 in fan duct 28. In VCE 12 there is the ability to modulate how much of the fan stream passes through fan stub stage 16 and what portion passes directly in fan duct 28 to the back of generator 12. The modulation of the fan stream into fan stub stage 16 is performed by variable bypass control 30, which is regulated by a controller (not shown). Working with the controller, variable bypass control 30 can modulate that portion of the fan stream that goes directly through fan duct 28 to nozzle 26 and that portion that goes first to fan stub stage 16. This is where the variable cycle comes from.

The operation of variable cycle engines is well understood in the art (See U.S. Pat. No. 4,080,785, to Koff et al.), but for purposes of this application a high-level explanation will be used to aid in the teachings of the present invention. In operation of engine 10 of the present invention, a certain volume of air or certain flow of air enters the engine through fan stage 14. Fan stage 14 provides compression of the air up to a certain level. A small portion of the compressed air from fan stage 14 is directed to compressor stage 18 which is used to compress the air to a higher pressure. The compressed air is then discharged into combustor 20 where fuel is added and the mixture is ignited. The burning mixture expands and is discharged into turbine stage 22. Once the burnt compressed air passes through turbine stage 22, it can be discharged through fixed area geometry nozzle 26 and out of the engine. Turbine stage 22 may have two separate concentric shafts, first shaft 32 drives compressor stage 18 and fan stub stage 16, and second shaft 34 drives fan stage 14.

Fan stage 14 compresses air through its blades 36 thereby creating a part of the thrust of generator 12 with the fan stream; the other part being created by the compressor stage. Fan stage 14 therefore provides compressed air to be burned in generator 12 and compressed air in the fan stream to create thrust from generator 12. Much of the fan stream passes around the rest of generator 12 to nozzle 26 in annular fan duct 28. The fan stream provides much of engine's thrust when engine 10 is not operating in after-burner mode.

When additional thrust is required, above that available from fan stage 14 augmenter 24 is employed. In after-burner mode, exhaust from turbine stage 22 is mixed back in with the fan stream that has bypassed generator in fan duct 28. Therefore, in the augmenter 24, there is a stream of air provided from turbine stage 22 and a stream provided from fan duct 28. To obtain additional thrust, additional fuel is added to these two streams in augmenter 24 and the mixture is ignited. The burning of the exhaust from turbine stage 22 and the fan stream from fan duct 28 in augmenter 24 can double the thrust of engine Augmenter 24 of the present invention is a controllable device which can be accessed on demand to provide additional thrust.

To manage the back pressure caused by after-burning in augmenter 24, engine 10 of the present invention utilizes the variable compression available with VCE generator 12 of the fan stream in fan duct 28 to eliminate the need to open nozzle 26. In engine 10 of present invention depicted in FIG. 1, effects of after-burning are offset by increasing the amount of the fan stream that is directed to fan stub stage 16 for compression. This, in turn, increases the pressure of the fan stream in fan duct 28. The increase in pressure ratio of the fan stream in fan duct 28 accommodates the back pressure associated with after-burning that can stall generator 12. Therefore, in engine 10 of the present invention a schedule is predetermined so that when engine 10 enters after-burning mode the portion of the fan stream compressed in fan stub stage 16 is increased by variable bypass control 30. This allows using fixed geometry exhaust nozzle 26 in engine 10 having after-burning capability.

Figure 2:
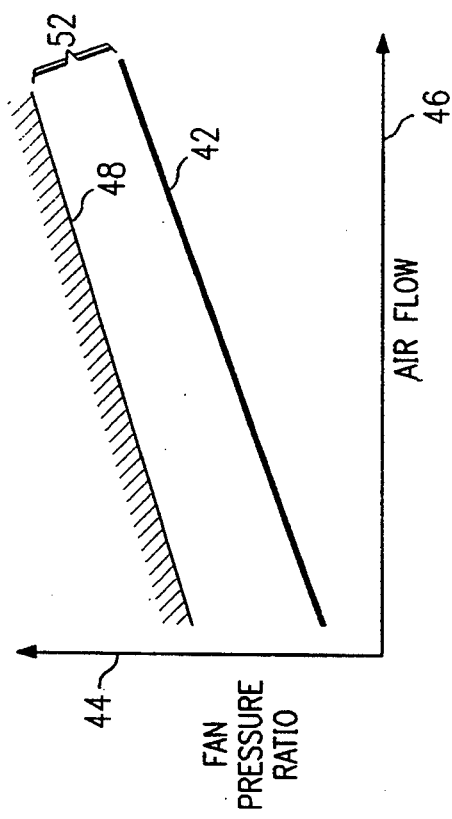
FIG. 2 illustrates a typical engine performance operating line.

In FIG. 2 is depicted typical operating line 42 for engine 10. Vertical axis 44 is the fan pressure ratio for engine 10. Horizontal axis 46 is the engine air flow rate. FIG. 2 shows that fan pressure ratio 44 of engine 10 varies as a function the amount of air flow 46 passing through engine 10. Air flow 46 through engine 10 increases as the rotational speed of fan stage 14 increases. Therefore, more thrust equates to more air flow which equates to more fan pressure ratio 44.

The top line of FIG. 2 is stall line 48 and indicates a line of performance if fan stage 14 was operated at the highest pressure that it can maintain without stalling. Below stall line 48 is operational line 42. In typical turbo machinery, because of irregularities in the air flow, it is not possible to operate the engine on stall line 48. Engines are therefore designed and operated below the optimum level represented by stall line 48. The difference between stall line 48 and operating line 42 is referred to as stall margin 52.

Operating line 42 is affected by two important phenomena. As the temperature in nozzle 26 increases, as during after-burning mode, operating line 42 of engine 10 tends to move towards stall line 48 with a reduction in the safety or stall margin 52 of engine 10. To offset the reduction in stall margin 52 associated with the increased temperature in nozzle 26 during after-burning, with fixed nozzle 26 it is desirable to increase the fan pressure to increase stall margin 52. Increasing the fan pressure tends to move operating line 42 away from stall line 48 thereby increasing stall margin 52. The effects of after-burning decreasing stall margin 52 and the effects of increasing the fan pressure to increase stall margin 52 can be offset and scheduled with each other to provide desired operational line 42 without the need to vary nozzle 26. This scheduling allows for achieving the thrust available with after-burning, but also allowing for the use of fixed geometry nozzle 26 and the advantages thereof.

In engine 10 of the present invention depicted in FIG. 1, fan stub stage 16 is used to control the fan stream pressure to offset the effects of after-burning. This allows engine 10 to be operated along operational line 38 while providing the increased thrust available through after-burning.

Figure 3:
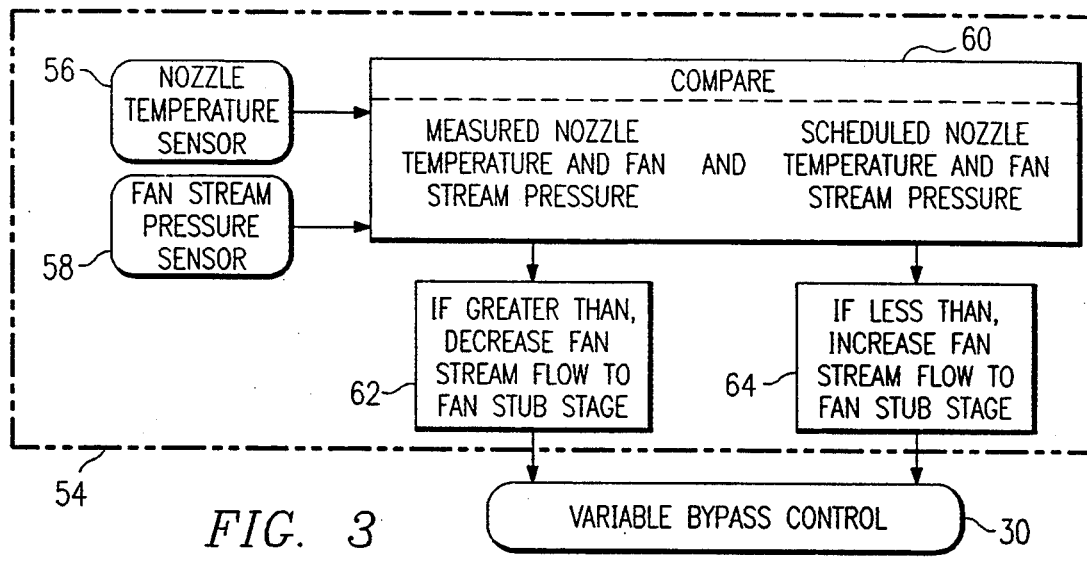
FIG. 3 illustrates a flow diagram for a simplified engine control system.

FIG. 3 shows a flow diagram for one embodiment of controller 54 of engine 10 of the present invention. The function of controller 54 is to maintain the operating line on fan stage 14 throughout the thrust range, including after-burning. In step 56 a sensor is used to monitor the temperature in nozzle 26, and in step 58 a sensor is used to monitor the pressure of the fan stream. In step 60, the measured temperature in nozzle 26 and measured fan stream pressure are compared to a schedule stored in control circuitry (not shown) for those values. If they are different than that scheduled, controller 54 will in step 62 command variable bypass control 30 to vary the amount of the fan stream that is directed to fan stub stage 16. Fan stub stage 16 is, therefore, used to move operational line 42 shown in FIG. 2 down from stall line 48 when the temperature in nozzle 26 is increasing as during after-burning, and up towards stall line 48 when the temperature in nozzle 26 is decreasing.

Figure 4:
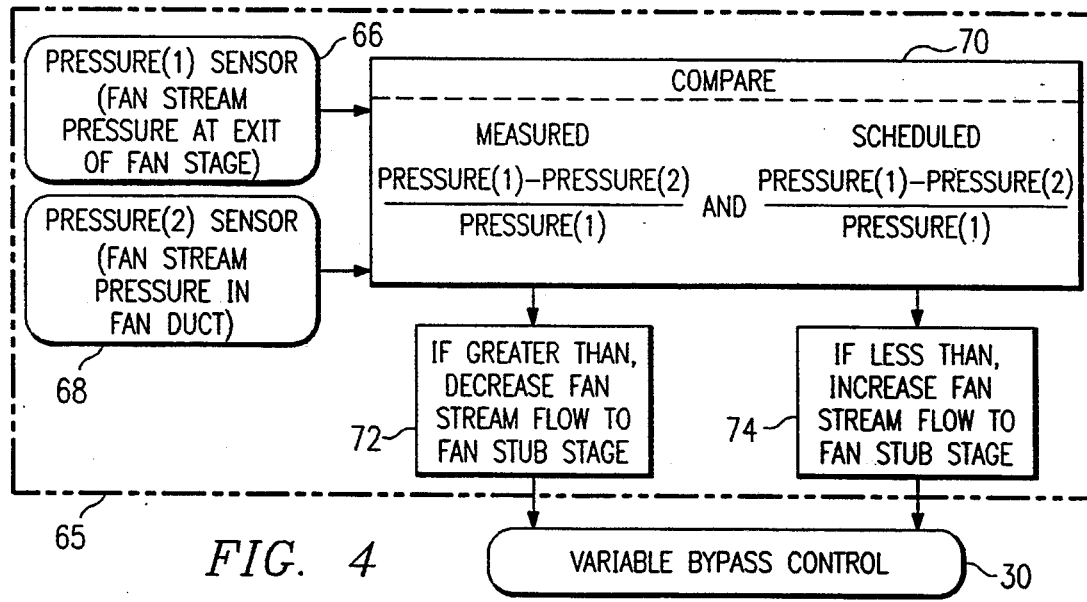
FIG. 4 illustrates a flow diagram for another level for the engine control system.

FIG. 4 shows a flow diagram for a second level 65 of controller 54 of engine 10 of the present invention. At level 65 of controller 54 a sensor is used at step 66 to measure a first fan stream pressure (Pressure (1)), which is the total pressure of the fan stream as it exits fan stage 14 but before it enters the core of generator 12. At step 68 a sensor is used to measure a second fan stream pressure (Pressure (2)), which is the static pressure in fan duct 28. At step 70 the difference between these two pressures are ratio to Pressure (1) in the fan stream and that ratio is compared to a scheduled ratio which is stored in control circuitry (not shown) of controller 54. If the ratio of the two pressures is greater than that which is scheduled, then the portion of the fan stream directed to fan stub stage 16 is decreased at step 72 by variable bypass control 30 to increase the pressure of the fan stream in fan duct 28. If the ratio of the two pressures is measured to be less than that scheduled, then the portion of the fan stream directed to fan stub stage 16 is increased at step 74 by variable bypass control 30 to decrease the fan stream pressure in fan duct 28.

The sensors used by controller 54 in both FIGS. 3 and 4 are feeding into the control circuitry of controller 54 where the measured values of temperature and pressure are compared with scheduled values. In order to maintain engine performance along desired operational line 42, the control circuitry of controller 54 can increase or decrease appropriately, with variable bypass control 30, that portion of fan stream entering fan stub stage 16. Controller 54 is primarily concerned with how much additional compression will be added to the fan stream by fan stub stage 16 in order to maintain the desired engine performance near predetermined scheduled operation line 42 throughout periods of low thrust on up to after-burner. It is envisioned that the control circuitry of controller 54 will employ fuzzy logic so that the predetermined scheduled operation will be modified over time as the engine's applications change, i.e. deployment of the aircraft in the Arctic versus at the Equator.

In a typical operational scenario, engine 10 of the present invention depicted in FIG. 1 will be operating at a constant level while the aircraft is "cruising" at a desired speed. When the pilot commands additional thrust the fan speed and air flow increase to provide additional thrust. As the thrust demand increases there is reached a point where no additional thrust is available from the turbo machinery of VCE generator 12. Additional thrust is available with after-burning in augmenter 24. Once augmenter 24 ignites, the back pressure associated with after-burning would tend to back pressure fan stage 14 and cause it to stall generator 12 as described above. To offset the back pressure, controller 54, sensing the rise in temperature in nozzle 26, and the change in the fan stream pressure at various stages in engine 10, causes variable bypass control 30 to direct more of the fan stream to fan stub stage 16 for compression. This increases the pressure ratio in the fan stream in fan duct 28 and prevents back-pressure from stalling generator 12 during after-burning. The opposite sequence of events take place as the thrust demands are diminished, engine 10 terminates after-burner mode and begins to rely totally on the turbo machinery of generator 12 to provide the necessary thrust.

Figure 5A:
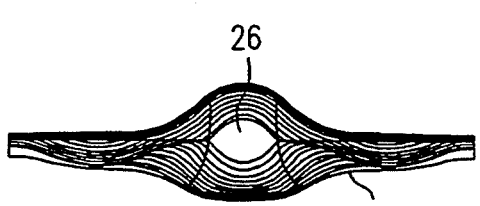
FIGS. 5a and 5b illustrate the integration available with an engine of the present invention with conformal apertures.
Figure 5B:
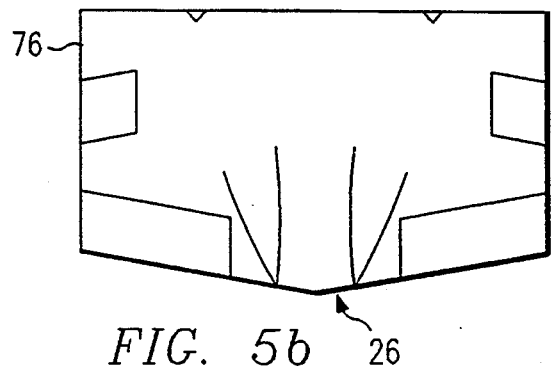

FIGS. 5a and 5b depict the integration available for an engine using the fixed geometry nozzle of the present invention. FIG. 5a is a view looking at the back of airframe 76 into nozzle 26, and FIG. 5b is a view looking down on airframe 76. As can be seen, the engine's rounded nozzle 26 matches nicely with the contours of low observable airframe 76.

The combination of variable compression engine and fixed geometry nozzle provide the enhancements of mechanical simplicity, low weight, low cost, good reliability and maintainability, improved aerodynamic integration, good observables performance, enhanced LO cooling and coatings, no leakage losses and improved structural integration opportunities.

Although the present invention has been described in detail, it should be understood that various changes, substitutions and alterations can be made hereto without departing from the spirit and scope of the invention as defined by the appended claims.

What is claimed is:

1. A method for generating thrust in an engine, comprising the steps of:
   compressing air with a compressor stage;
   mixing fuel with the compressed air;
   igniting a mixture of compressed air and fuel causing the mixture to burn and expand;
   transferring the expanding mixture to a turbine stage;
   driving at least one shaft with the turbine stage;
   directing an exhaust from the turbine stage to a nozzle for discharge from the engine;
   driving a fan stage with the at least one shaft for creating thrust with a fan stream;
   driving the compressor stage with the at least one shaft;
   driving a fan stub stage with the at least one shaft;
   directing the fan stream from the fan stage in a fan duct to the nozzle;
   monitoring a temperature in the nozzle;
   monitoring a fan stream pressure;
   comparing the temperature in the nozzle and the fan stream pressure to a predetermined schedule for the temperature and pressure; and
   modulating a portion of the fan stream to the fan stub stage in response to said comparing step.

2. The method of claim 1, wherein said modulating step comprises:
   increasing the portion of the fan stream to the fan stub stage to increase the fan stream pressure when the temperature and pressure comparison is less than the schedule; and
   decreasing the portion of the fan stream to the fan stub stage to decrease the fan stream pressure when the temperature and pressure comparison is greater than the schedule.

3. The method of claim 1, further comprising the steps of:
   adding additional fuel to a combination of the exhaust from the turbine stage and the fan stream from the fan duct; and
   igniting the combination creating additional thrust from the engine.

4. The method of claim 1, wherein said step of monitoring a fan stream pressure further comprises the steps of:
   measuring a first pressure of the fan stream as the fan stream exits the fan stage; and
   measuring a second pressure of the fan stream in the fan duct.

5. The method of claim 4, further comprising the steps of determining a ratio of the difference between the first pressure and second pressure to the first pressure, and comparing the pressure ratio to a scheduled pressure ratio.

6. The method of claim 5, wherein said modulating step comprises:
   increasing the portion of the fan stream to the fan stub stage to increase the fan stream pressure when the ratio is less than the scheduled pressure ratio; and
   decreasing the portion of the fan stream to the fan stub stage to decrease the fan stream pressure when the ratio is greater than the scheduled pressure ratio.

7. The method of claim 1, further comprising the step of compressing air with the fan stage before the air enters the compressor stage.

8. The method of claim 1, wherein said modulating step is in response to a predetermined desired performance of the engine.

9. The method of claim 1, wherein said driving at least one shaft step further comprises;
   driving a first shaft with the turbine stage, the first shaft driving the compressor stage and fan stub stage; and
   driving a second shaft concentric to the first shaft with the turbine stage, the second shaft driving the fan stage.

10. An engine, comprising:
    a fan stage operable to create thrust with a fan stream;
    a compressor stage operable to compress air;
    a fan stub stage coupled to said fan stage and said compressor stage, said fan stub stage is operable to further compress air;
    a fan duct coupled to said fan stage and operable to direct the fan stream from said fan stage to an engine nozzle;
    a variable bypass control coupled to said fan duct and said fan stub stage, said variable bypass control operable to modulate a portion of the fan stream in said fan duct to said fan stub stage;
    a combustor operable to ignite a mixture of the compressed air and fuel causing the mixture to burn and expand;

a turbine stage driven by the expanding mixture from said combustor, said turbine stage operable to drive at least one shaft;

said at least one shaft operable to drive said fan stage, said compressor stage, and said fan stub stage;

said nozzle coupled to said turbine stage operable to discharge an exhaust from said turbine stage, said nozzle also coupled to said fan duct and further operable to discharge the fan stream from said fan stage;

a temperature sensor operable to monitor a temperature in the nozzle;

a pressure sensor operable to measure the pressure in the fan stream; and a controller operable to compare the nozzle temperature and the fan stream pressure to a predetermined schedule, said controller further operable to control said variable bypass control.

11. The engine of claim 10, wherein said controller is further operable to increase the amount of the fan stream directed to said fan stub stage with said variable bypass control when the temperature and pressure comparison is less than the schedule, said controller further operable to decrease the amount of fan stream directed to said fan stub stage when the temperature and pressure comparison is greater than the schedule.

12. The engine of claim 10, further comprising an augmenter coupled between said turbine stage and said nozzle, said augmenter operable to mix additional fuel with a combination of the exhaust from said turbine stage and the fan stream from said fan duct, said augmenter further operable to ignite the mixture to create additional thrust from the engine.

13. The engine of claim 10, wherein said fan stage is further operable to compress air before it enters said compressor stage.

14. The engine of claim 10, wherein said pressure sensor comprises:

a first pressure sensor operable to measure a first pressure of the fan stream as the fan stream exits said fan stage; and a second pressure sensor operable to measure a second pressure of the fan stream in said fan duct.

15. The engine of claim 14, wherein said controller is further operable to determine a ratio of the difference between the first and second pressure to the first pressure, said controller further operable to compare the ratio to a scheduled pressure ratio.

16. The engine of claim 15, wherein said controller is further operable to increase the amount of the fan stream directed to said fan stub stage with said variable bypass control when the pressure ratio is less than the scheduled pressure ratio, said controller is further operable to decrease the amount of the fan stream directed to said fan stub stage with said variable bypass control when the pressure ratio is greater than the scheduled pressure ratio.

17. The engine of claim 10, wherein said controller comprises fuzzy logic operable to modify the predetermined schedule.

18. The engine of claim 10, wherein said nozzle has a fixed cross-sectional area throughout.

19. The engine of claim 10, wherein said at least one shaft further comprises:

a first shaft driven by said turbine stage, said first shaft operable to drive said compressor stage and said fan stub stage; and a second shaft concentric to said first shaft driven by said turbine stage, said second shaft operable to drive said fan stage.

20. A method for generating thrust in an engine, comprising the steps of:

compressing air with a compressor stage and a fan stage;

mixing fuel with the compressed air;

igniting a mixture of the compressed air and fuel causing the mixture to burn and expand;

transferring the expanding mixture to a turbine stage;

driving a first shaft with the turbine stage, the first shaft driving the compressor stage and a fan stub stage;

driving a second shaft concentric to the first shaft with the turbine stage, the second shaft driving the fan stage thereby creating thrust with a fan stream;

directing an exhaust from the turbine stage to a nozzle for discharge from the engine;

directing the fan stream from the fan stage in a fan duct to the nozzle;

adding additional fuel to a combination of the exhaust from the turbine stage and the fan stream from the fan duct and igniting the combination creating additional thrust from the engine;

measuring a temperature in the nozzle;

measuring a first pressure of the fan stream as the fan stream exits the fan stage;

measuring a second pressure of the fan stream in the fan duct;

ratioing a difference between the first pressure and second pressure to the first pressure;

comparing the temperature in the nozzle and the pressure ratio to a predetermined schedule for the temperature and pressure ratio; and modulating a portion of the fan stream to the fan stub stage in response to said comparing step, said modulating step further comprises increasing the portion of the fan stream to the fan stub stage to increase the fan stream pressure when the temperature and pressure ratio comparison is less than the schedule and decreasing the portion of the fan stream to the fan stub stage to decrease the fan stream pressure when the temperature and pressure ratio comparison is greater than the schedule.

21. The method of claim 20, wherein said modulating step is in response to a predetermined desired performance of the engine.

* * * * *